(No Model.)

F. E. MEYER.
Process of Coating Real and Imitation Precious Stones.

No. 236,608.            Patented Jan. 11, 1881.

Witnesses.
Wm. H. Brown
J. B. Thurston

Inventor.
Francis Ed' Meyer
By his attorney
M. Randolph

UNITED STATES PATENT OFFICE.

FRANCIS ED. MEYER, OF NEW YORK, N. Y.

PROCESS OF COATING REAL AND IMITATION PRECIOUS STONES.

SPECIFICATION forming part of Letters Patent No. 236,608, dated January 11, 1881.

Application filed December 13, 1880. (No model.)

*To all whom it may concern:*

Be it known that I, FRANCIS ED. MEYER, of the city, county, and State of New York, have made certain new and useful improvements in a process for treating transparent or translucent real or imitation precious stones, compositions of glass or paste, for the purpose of coating them, or rather one side of them, with a highly-reflective substance, so as to enhance their brilliancy, and thus bring out to the best advantage the wonderful refulgence or luster of the gem, semi-gem, or imitation precious stones; and I hereby declare the following to be a full and clear description of my new process.

This invention is in the same line as and supplementary to Patents Nos. 223,237, 229,328, and 233,364, all being for improvements in real or imitation precious stones, and is designed to carry out and economically utilize the improvements set out in the said patents.

In this invention, as well as those above cited, a highly-reflective coating is applied to the lower part, rear side, or "collect" of the transparent or translucent real or imitation precious stone or gem; but the object of this invention is to speedily, thoroughly, and economically apply the said reflective coating, and this I now propose to do by first coating the whole of the real or imitation stone or gem with the reflective material, and then afterward remove the said reflective substance from the front side, face, or crown of the piece which is treated.

Figure 1:
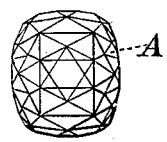
Figure 2:
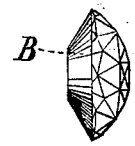
Figure 3:
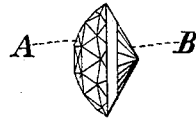
Figure 4:
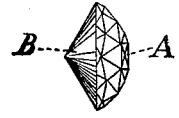

The invention will be readily understood by the accompanying drawings, of which Figure 1 is a front-face view of one of the improved real or imitation precious stones or gems. Fig. 2 is a side elevation of the same, showing the back face or collect side truncated. Fig. 3 is a similar side elevation of the improved real or imitation precious stone, showing the reflective coating applied to only a part of the rear face or collect of the stone. Fig. 4 is also a side elevation of the improved real or imitation precious stone; but in this view the whole of the rear face or collect of the stone is coated with the reflective substance.

The piece A which is to be treated may be any transparent or translucent real or imitation precious stone, gem, or semi-gem, compositions of glass or paste, and the crown or front face may be cut into any polygonous or desired shape, and the collect, lower part, or rear face may be a faceted or plain, full or truncated, cone, or made in any desired shape. The whole of the exterior face of the real or imitation precious stone, compositions of glass or paste, will first be entirely coated with some highly reflective substance, either by the nitrate of silver process or any other suitable reflective coating process, and then the reflective coating fixed in place by the application of a due degree of heat, or in any other suitable way. I then finish the collect, or back, or rear part of the real or imitation stone or gem with some protecting substance, such as varnish, wax, or such other like protecting substance, after which a coating of bronze or gilt will be applied to the exterior of the said varnish or wax, substantially as described in the former patents granted to me on this subject, said patents being respectively numbered 223,237, 229,328, and 233,364. After this back or protective coating shall have been fully fixed, as above described, I remove or take off all of the reflective substance from the crown or front face of the real or imitation stone or gem so treated, possibly by acid, or by some polishing material, or by means of a fine buffer, or by any other suitable means, so as to allow the reflective coating which has been applied to the rear part or collect of the real or imitation stone or gem to reflect the light back through the front face or crown, thereby greatly enhancing the brilliancy of the real or imitation stone or gem, substantially as in my former patents above cited.

The reflective substance applied, as above described, to the rear or collect side of the stone or gem may be coated with a metallic protective covering by means of a battery, either before or after the reflective coating shall have been removed from the front face or crown of the real or imitation stone or gem. And when this protecting coating is applied by a battery the process will be quite similar to that used for electroplating, with only such practical modifications of the same as shall adapt it to this particular purpose.

The important point in this invention consists in simplifying the coating process by applying the coating, which is represented by the letter B in the drawings, to the whole of the exterior surface of the real or imitation stone or gem, and then removing the said reflective substance from the front face or crown of the said stone or gem, and by so doing the process of coating the said stones or gems is much easier applied than by the process of coating with the reflective substance only the rear or collect side of the stone or gem, as described in my former patents above alluded to.

Having described my invention, I claim—

The process herein described of applying a reflective coating, B, to the rear face or collect of a real or imitation precious stone or gem, compositions of glass or paste, A, by first coating the said stone A entirely with the reflective material B, and then removing by any suitable means the reflective coating from the front face or crown of the said stone or gem.

FRANCIS ED. MEYER.

Witnesses:
M. RANDOLPH,
J. B. THURSTON.